United States Patent [19]

Eagan

[11] Patent Number: 4,746,132
[45] Date of Patent: May 24, 1988

[54] MULTI-WHEELED CYCLE

[76] Inventor: Robert W. Eagan, 1302 NE. 4th Ter., Cape Coral, Fla. 33909

[21] Appl. No.: 11,608

[22] Filed: Feb. 6, 1987

[51] Int. Cl.$^4$ .................... A63H 17/00; B62H 1/12; B62K 5/00
[52] U.S. Cl. ................... 280/1.13; 280/226 R; 280/266; 280/270; 280/282
[58] Field of Search ............ 280/200, 204, 208, 210, 280/211, 226 R, 226 A, 239, 263, 265, 266, 270, 1.1 R, 1.11 R, 1.13, 92, 282, 1, 189, 1.14, 1.203, 293

[56] References Cited

U.S. PATENT DOCUMENTS

| | | | |
|---|---|---|---|
| 36,161 | 8/1862 | MacKenzie | 280/270 X |
| 359,127 | 3/1887 | Brusie | 280/293 |
| 378,253 | 2/1888 | Latta | 280/270 |
| 524,019 | 8/1894 | Desmond | 280/270 X |
| 3,282,606 | 11/1966 | Casner | 280/239 |

FOREIGN PATENT DOCUMENTS 603051  6/1948  United Kingdom .......... 280/226 A

*Primary Examiner*—John J. Love
*Assistant Examiner*—Mitchell J. Hill
*Attorney, Agent, or Firm*—Charles J. Prescott

[57] ABSTRACT

A multi-wheeled cycle comprising a frame, a main wheel, and at least one auxiliary wheel secured for rotation at one end of the frame forwardly or rearwardly of the main wheel, and a spaced-apart pair of auxiliary wheels secured for rotation at the other end of the frame rearwardly or forwardly of the main wheel. The main wheel is held for rotation to the mid-portion of the frame and includes a conventional crank and pedal assembly for foot rotation of the main wheel while the user is seated atop the cycle. The bottom of the main wheel lies below the plane defined by the bottoms of the auxiliary wheels to facilitate unique maneuvering and operation. The main wheel may also be pivotable about a vertical axis passing through it. All axes of rotation of the wheels are generally horizontal.

16 Claims, 1 Drawing Sheet

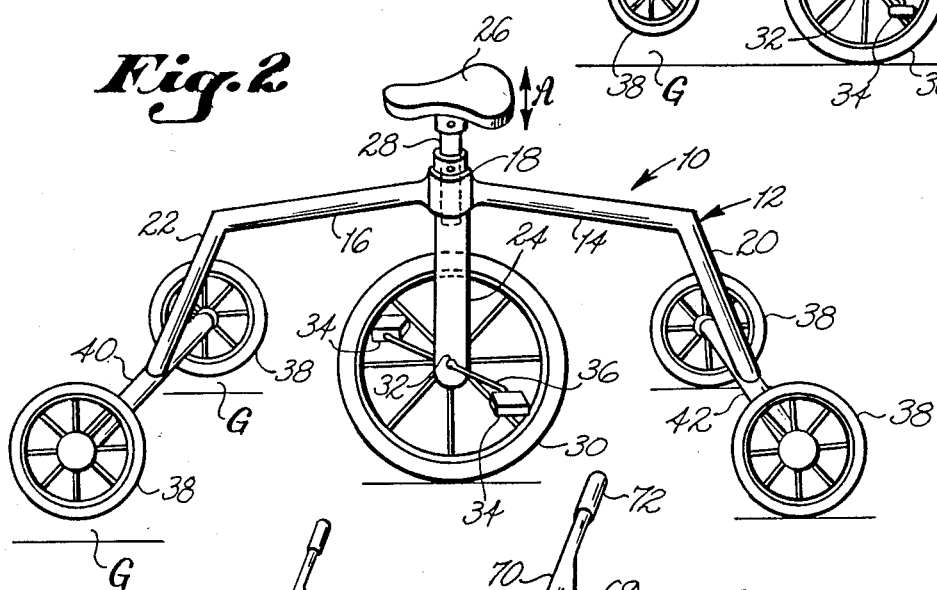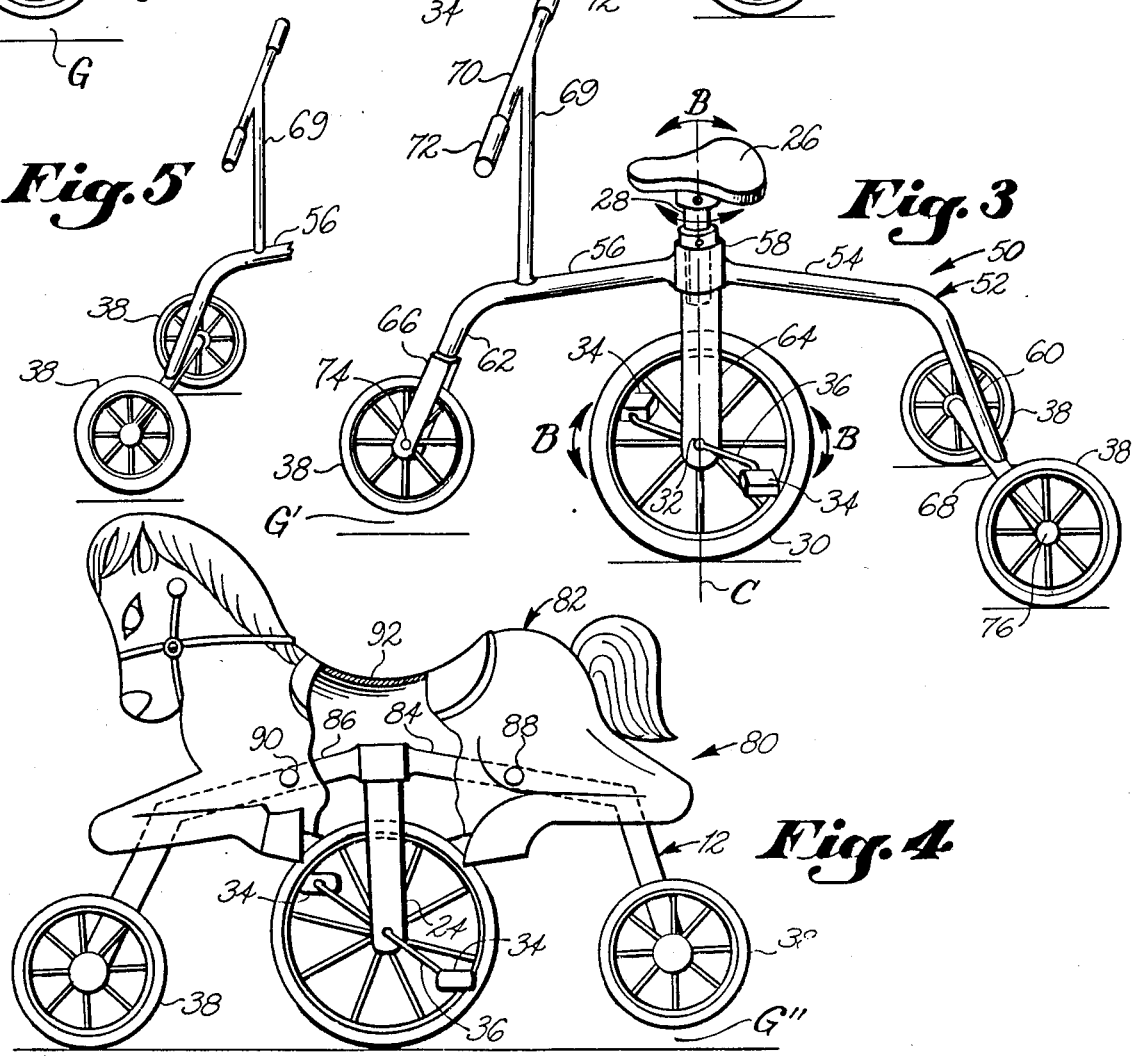

MULTI-WHEELED CYCLE

BACKGROUND OF THE INVENTION

This invention generally relates to manually propelled cycles, and more particularly to a multi-wheeled cycle operable, in part similar to that of a unicycle.

In addition to well-known unicycles, bicycles and tricycles, applicant is aware of a number of additional inventions disclosed in prior U.S. patents which disclose multi-wheeled cycles.

U.S. Pat. No. 323,289 to Blount discloses a bicycle having an auxiliary bicycle supporting wheel adapted to be attached to the front fork of the bicycle in coplaner alignment with the main wheels of the bicycle. The safety attachment for bicycles disclosed in U.S. Pat. No. 319,385 to Bevan discloses laterally spaced outrigger-type auxiliary wheels on either side of the main wheel for preventing the bicycle from tipping.

The multi-auxiliary wheeled attachment disclosed in U.S. Pat. No. 359,127 to Brusie is intended to prevent riding accidents known as "headers" wherein sudden stopage of the bicycle propels the user forwardly of the center of gravity of the bicycle and onto the ground in front of the bicycle.

The manually propeled vehicle disclosed in U.S. Pat. No. 3,589,749 to Byrd is intended primarily for amusement purposes and bears little resemblence to the structure of the present invention.

Lastly, the figure-formed cycle invented by Fowler and described in U.S. Pat. No. 2,646,990 describes the adaptation of an animal-like shell structure adapted to fit over the main elements of a conventional bicycle while otherwise facilitating the full normal operation of same.

The present invention, unique in structure in relation to the above art, provides a multi-wheeled cycle wherein the bottom of the main centrally positioned wheel lies below the plane defined by the bottoms of at least one forwardly disposed auxiliary wheel and at least two rearwardly disposed spaced apart auxiliary wheels. Such structure facilitates unique maneuverability and operation while enhancing the user's ability, when desired, to practice operating the cycle as a unicycle in safety.

BRIEF SUMMARY OF THE INVENTION

This invention is directed to a multi-wheeled cycle comprising a frame, a main wheel, and at least one auxiliary wheel secured for rotation at one end of the frame forwardly or rearwardly of the main wheel, and a spaced-apart pair of auxiliary wheels secured for rotation at the other end of the frame rearwardly or forwardly of the main wheel. The main wheel is held for rotation to the mid-portion of the frame and includes a conventional crank and pedal assembly for foot rotation of the main wheel while the user is seated atop the cycle. The bottom of the main wheel lies below the plane defined by the bottoms of the auxiliary wheels to facilitate novel maneuvering and operation. The main wheel may also be pivotable about a vertical axis passing through it. All axes of rotation of the wheels are generally horizontal.

It is therefore an object of this invention to provide a novel multi-wheeled cycle having unique maneuvering and operating features.

It is another object of this invention to provide a novel multi-wheeled cycle having inherent stability in providing unicycle-type operating features.

In accordance with these and other objects which will become apparent hereinafter, the instant invention will now be described with reference to the accompanying drawings in which:

BRIEF DESCRIPTION OF THE DRAWINGS

FIG. 1 is a side elevation view of one embodiment of the invention.

FIG. 2 is a perspective view of the embodiment of the invention shown in FIG. 1.

FIG. 3 is a perspective view of another embodiment of the invention.

FIG. 4 is a side elevation broken section view of another embodiment of the invention.

FIG. 5 a partial perspective view showing an alternate embodiment of the FIG. 3 embodiment.

DETAILED DESCRIPTION OF THE INVENTION

Referring now to the drawings, and particularly to FIGS. 1 and 2, the preferred embodiment of the invention is shown generally at numeral 10 and includes a frame 12, main wheel 30, and auxiliary wheels 38, as well as seat 26. The frame 12 includes a forwardly extending portion 16 and front portion 22 downwardly disposed therefrom and rearwardly extending portion 14 with back or rear portion 20 extending downwardly therefrom.

The main wheel 30 is held for rotation about axle 32 in fork 24 which is rigidly connected to collar 18 in the mid-portion of frame 12. Seat 26 is rigidly securable on shaft 28 in collar 18 such that seat 26 may be vertically adjustable in the direction of arrow A as shown in FIG. 2.

The main wheel 30 includes crank 36 and opposing pedals 34 disposed therefrom such that the user may, by downward foot pressure while positioned on seat 26 astride the cycle 10, force rotation of the main wheel 30 to propel the cycle 10.

An opposing spaced apart pair of auxiliary wheels 38 are disposed for rotation on the end of shaft 40 connected to the front portion 22, while a spaced pair of auxiliary wheels 38 are also disposed on shaft 42 connected to the back portion 20.

All of the axes of rotation of the main and auxiliary wheels 30 and 38 are generally parallel and horizontally disposed to the ground.

The bottom of the main wheel 30 is positioned below the plane passing through the bottoms of the auxiliary wheels 38 such that, when the cycle 10 is placed atop a flat surface, a gap G is formed between one or the other opposing pairs of the auxiliary wheels 38 as shown in FIGS. 1 and 2. The gap G, formed by the specific vertical orientation of the bottoms of the main and auxiliary wheels 30 and 38 respectively is provided so that the user may more effectively maneuver and turn the cycle 10 and may also propel same in unicycle fashion wherein none of the auxiliary wheels 38 are in contact with the ground. Additionally, when the vehicle is propelled forwardly, and/or the positioning of the user's weight moves the center of gravity rearwardly of axle 32, the rear set of auxiliary wheels 38 disposed from shaft 42 are in contact with the ground to provide support and stability in the position shown. However, when the cycle 10 is propelled rearwardly, and/or the positioning of the user's weight shifts the center of gravity forwardly of axle 32, the other pair of auxiliary wheels 38 disposed from the forward shaft 40 come in contact with the ground to again provide omni directional support and stability for the cycle 10 while also maintaining enhanced overall maneuverability and turning capability for the user resting seated atop seat 26 and propelling the cycle 10 by downward foot pressure into pedals 34.

Referring now to FIG. 3, another embodiment of the invention is shown generally at 50. This embodiment 50 includes frame 52 having a forwardly disposed portion 56 with a front portion 62 downwardly disposed therefrom and rearwardly disposed portion 54 with back portion 60 downwardly disposed therefrom. The front portion 62 has fork 66 rigidly connected thereto which holds auxiliary wheel 38 for rotation about axle 74, while a pair of spaced auxiliary wheels 38 are positioned for rotation about axle 76 on shaft 68 connected to back portion 60. Frame 52 also includes rigidly connected handle 69 having a generally T-shape as shown with crossbar 70 having grips 72 at each distal end.

FIG. 5 shows an alternate embodiment of the cycle of FIG. 3. In lieu of the single wheel connected to forwardly disposed frame portion 56, a pair of spaced auxiliary wheels 38 may be provided along with handle 69.

The main wheel 30 is again held for rotation in fork 64 about axle 32 with crank 36 and opposing pedals 34 attached thereto for driving the main wheel 30. However, in this embodiment, the fork 64 is mounted for pivotal rotation in the direction of arrows B about vertical axis C for further enhanced unique maneuverability and agility. Seat 26 mounted on shaft 28 is connected to fork 64 mounted in collar 58 so that the seat 26 likewise moves in the direction of arrow B about vertical axis C.

This embodiment 50 also includes the geometric relationship wherein the bottom of the main wheel 30 is disposed downwardly from the plane passing through the bottoms of all three auxiliary wheels 38 such that gap G' is realized when the cycle 50 is placed atop a flat surface. As previously described, the gap G' may occur either between the front auxiliary wheel 38 disposed from front fork 66 or between the auxiliary wheels 38 disposed on shaft 68, depending on the direction and pressure with which the user pedals the cycle 50.

Referring lastly to FIG. 4, another embodiment of the invention is shown generally at 80 having frame 12 and portions thereof as similarly described with respect to FIGS. 1 and 2. Likewise, this embodiment 80 also includes main wheel 30, fork 24, crank 36 with opposing pedals 34 disposed therefrom whereby the user may, by downward foot action, propel the cycle 80 via rotation of the main wheel 30.

However, the embodiment 80 shown in FIG. 4 includes ornamental animal figurine 82 which is bolted to the frame 12 by bolts 88 and 90. The ornamental figurine 82 is generally of a shell-type construction for light weight and to facilitate fitting around and generally conceal the majority of frame 12. Seat portion 92 is provided for the user to rest upon and to propel the cycle 80 as previously described.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A multi-wheeled cycle operable as a unicycle comprising:
   a frame having a mid-portion and first and second portions extending from said mid-portion in opposite directions;
   a vertical axis extending through said mid-portion of said frame at the center thereof;
   said frame mid-portion including a user support means located on said vertical axis for supporting the user while seated with legs astride said frame;
   a main wheel rigidly connected for rotation to, and disposed from, said frame mid-portion in a fork;
   said fork being generally upright, located on said vertical axis and having an upper end, and said main wheel having a horizontal axis located on said vertical axis;
   a collar on said frame mid-portion having a vertical portion for receiving and supporting said upper end of said fork;
   said main wheel having opposing pedals disposed from a crank operatively connected to said main wheel on said horizontal axis for propelling said cycle;
   at least one auxiliary wheel rigidly connected for rotation to said frame first portion;
   at least two spaced apart auxiliary wheels rigidly connected for rotation to said frame second portion;
   the axes of rotation of said auxiliary wheels generally horizontal and parallel;
   the bottom of said main wheel lying below the plane formed by the bottoms of said auxiliary wheels.

2. A multi-wheeled cycle as set forth in claim 1, further comprising:
   an additional auxiliary wheel rigidly connected for rotation to said frame first portion in spaced apart relation to said one auxiliary wheel.

3. A multi-wheeled cycle as set forth in claim 1, wherein:
   said user support means is a bicycle-type seat.

4. A multi-wheeled cycle as set forth in claim 1, wherein:
   said user support means is included in an ornamental figurine rigidly connected over and to said frame.

5. A multi-wheeled cycle as set forth in claim 1, further comprising:
   a handle disposed and upwardly extending from said frame first portion.

6. A multi-wheeled cycle as set forth in claim 1, further comprising:
   a handle disposed and upwardly extending from said frame second portion.

7. A multi-wheeled cycle as set forth in claim 1, wherein:
   said main wheel is also pivotable in relation to said frame about said vertical axis.

8. A multi-wheeled cycle as set forth in claim 7, wherein:
   said user support means is a bicycle-seat and is rigidly connected to and pivots with said main wheel.

9. A multi-wheeled cycle operable as a unicycle comprising:
   a frame having a mid-portion and first and second portions extending from said mid-portion in opposite directions;

a cycle axis extending through said mid-portion of said frame at the center thereof;

user support means supported by said frame and located on said cycle axis above said frame for supporting a user while seated with legs astride said frame;

a fork supported by said frame and located on said cycle axis below said frame;

said fork being generally upright and having an upper end;

a collar on said frame mid-portion having a vertical portion for receiving and supporting said upper end of said fork;

a main wheel having an axis of rotation located on said cycle axis and mounted for rotation in said fork;

said main wheel having opposed pedals disposed from cranks operatively connected to propel said cycle;

at least one auxiliary wheel rigidly connected for rotation to said frame first portion;

at least two spaced apart auxiliary wheels rigidly connected for rotation to said frame second portion;

the axes of rotation of said main and auxiliary wheels being generally horizontal and parallel; and the bottom of said main wheel lying below the plane formed operated as a unicycle by keeping said auxiliary wheels spaced from the ground.

10. A multi-wheeled cycle as set forth in claim 9, further comprising:

an additional auxiliary wheel rigidly connected for rotation to said frame first portion in spaced apart relation to said one auxiliary wheel.

11. A multi-wheeled cycle as set forth in claim 9, wherein:

said user support means is a bicycle-type seat.

12. A multi-wheeled cycle as set forth in claim 9, wherein:

said user support means is a part of an ornamental figurine rigidly connected over and to said frame.

13. A multi-wheeled cycle as set forth in claim 9, further comprising:

a handle disposed and upwardly extending from said frame first portion.

14. A multi-wheeled cycle as set forth in claim 9, further comprising:

a handle disposed and upwardly extending from said frame second portion.

15. A multi-wheeled cycle as set forth in claim 9, wherein:

said fork is pivotable in relation to said frame in said collar.

16. A multi-wheeled cycle as set forth in claim 11, wherein:

said user support means is rigidly connected to and pivots with said main wheel.

* * * * *